US009509922B2

(12) United States Patent
Reichert, Jr.

(10) Patent No.: US 9,509,922 B2
(45) Date of Patent: Nov. 29, 2016

(54) CONTENT NORMALIZATION ON DIGITAL DISPLAYS

(75) Inventor: James Theodore Reichert, Jr., Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 13/211,346

(22) Filed: Aug. 17, 2011

(65) Prior Publication Data

US 2013/0044124 A1 Feb. 21, 2013

(51) Int. Cl.
*G06T 5/00* (2006.01)
*H04N 5/272* (2006.01)
*G06T 3/00* (2006.01)

(52) U.S. Cl.
CPC ............. *H04N 5/272* (2013.01); *G06T 3/00* (2013.01)

(58) Field of Classification Search
CPC ..... G06T 15/20; G06T 19/006; G06T 19/20; G06T 2219/2016; G06T 15/50; G06T 17/00; G06T 19/00; G06T 2207/30244; G06T 2215/16; G06T 7/0071; G06T 7/0075; G06T 15/00; G06T 15/60; G06T 17/05; G06T 19/003; G06T 2200/04; G06T 2207/10021; G06T 15/08; G06T 15/205; G06T 15/80; G06T 2200/21; G06T 2200/24; G06T 2207/10016; G06T 2207/10048; G06T 2207/10052; G06T 2207/10152; G06T 2207/20061; G06T 2207/20076; G06T 2207/20228; G06T 2207/30201; G06T 2207/03

See application file for complete search history.

(56) References Cited

U.S. PATENT DOCUMENTS

| 5,495,576 | A | * | 2/1996 | Ritchey | 345/420 |
| 5,594,935 | A | | 1/1997 | Reber et al. | |
| 6,462,769 | B1 | * | 10/2002 | Trowbridge et al. | 348/51 |
| 6,954,193 | B1 | * | 10/2005 | Andrade et al. | 345/90 |
| 7,384,158 | B2 | | 6/2008 | Ramachandran et al. | |
| 7,737,967 | B2 | | 6/2010 | Chernichenko et al. | |
| 8,704,879 | B1 | * | 4/2014 | Cheng et al. | 348/51 |

(Continued)

FOREIGN PATENT DOCUMENTS

| JP | 2008103978 A | * | 5/2008 |
| WO | WO 2011053319 A1 | * | 5/2011 |

OTHER PUBLICATIONS

Ishiguro, Yoshio, and Jun Rekimoto. "Peripheral vision annotation: noninterference information presentation method for mobile augmented reality." Proceedings of the 2nd Augmented Human International Conference. ACM, Mar. 2011.*

(Continued)

*Primary Examiner* — Sultana M Zalalee
(74) *Attorney, Agent, or Firm* — Micky Minhas

(57) ABSTRACT

Described herein are various technologies pertaining to dynamically modifying content that is desirably displayed on a large display to correct for distortions caused by a position of eyes of a user relative to the large display. Modification of the content is undertaken dynamically based at least in part upon a sensed or computed position of the user relative to the display.

20 Claims, 9 Drawing Sheets

(56) References Cited

U.S. PATENT DOCUMENTS

| | | | |
|---|---|---|---|
| 2002/0085119 A1* | 7/2002 | Van Overveld et al. | 348/553 |
| 2007/0229557 A1* | 10/2007 | Okumura et al. | 345/698 |
| 2008/0001918 A1* | 1/2008 | Hsu et al. | 345/157 |
| 2008/0049020 A1* | 2/2008 | Gusler | G06F 3/012 345/427 |
| 2008/0049185 A1* | 2/2008 | Huffman et al. | 351/206 |
| 2009/0051699 A1* | 2/2009 | Posa et al. | 345/619 |
| 2009/0295835 A1* | 12/2009 | Husoy | 345/660 |
| 2010/0039504 A1* | 2/2010 | Takahashi et al. | 348/54 |
| 2010/0053310 A1* | 3/2010 | Maxson et al. | 348/51 |
| 2010/0118055 A1 | 5/2010 | Nishibori | |
| 2011/0107216 A1* | 5/2011 | Bi | 715/716 |
| 2012/0287163 A1 | 11/2012 | Djavaherian | |

OTHER PUBLICATIONS

Hancock, et al., "Supporting Multiple Off-Axis Viewpoints at a Tabletop Display", Retrieved at <<http://ieeexplore.ieee.org/stamp/stamp.jsp?tp=&arnumber=4384126>>, In the Proceedings of Annual IEEE International Workshop on Horizontal Interactive Human-Computer System, Oct. 10-12, 2007, pp. 171-178.

Wartell, et al., "A Geometric Comparison of Algorithms for Fusion Control in Stereoscopic HTDs", Retrieved at <<http://homepages.cwi.nl/~robertl/2IV55/papers/hodges.pdf>>, May 7, 2001, pp. 1-49.

Robinett, et al., "The Visual Display Transformation for Virtual Reality", Retrieved at <<http://citeseerx.ist.psu.edu/viewdoc/download?doi=10.1.1.138.5816&rep=rep1&type=pdf>>, Sep. 1994, pp. 1-30.

"Guide to Anamorphic Encoding in HandBrake", Retrieved at <<https://trac.handbrake.fr/wiki/AnamorphicGuide>>, Retrieved Date: May 13, 2011, pp. 1-6.

"Adjusting Your Monitor for Optimum Viewing", Retrieved at <<http://owlcroft.com/monfix.shtml>>, Retrieved Date: May 13, 2011, pp. 1-4.

* cited by examiner

CONTENT NORMALIZATION ON DIGITAL DISPLAYS

BACKGROUND

Currently, a proliferation of large digital displays in public places is occurring. These large digital displays can serve the role of advertising billboards, information boards (e.g. timetables), display mechanisms for television shows or movies, etc. Furthermore, these relatively large digital displays are being positioned, for instance, on exteriors of buildings, inside museums, and in other locations that are readily accessible to viewers.

The proliferation of digital displays in public places is due at least in part to continuously decreasing costs corresponding to manufacturing and distributing such displays. As manufacturing techniques for liquid crystal displays, light emitting diode displays, and the like have steadily improved, costs corresponding to manufacturing and distributing these types of displays has plummeted. Thus, while in the recent past cost considerations prevented owners of businesses from placing relatively large digital displays in storefronts, currently these cost considerations have been greatly reduced.

Turning now to FIG. 1, an exemplary depiction of a relatively large digital display 100 relative to a user 102 that is viewing content depicted on the display 100 is illustrated. The display 100 may be particularly well-suited for conveying content to a relatively large number of people that are positioned at a relatively large distance from the display 100. As mentioned above, however, more and more relatively large displays (e.g., several feet in height by several feet in width) are being placed in public places, such that individuals may find themselves relatively proximate to the display 100.

The display 100 includes content 104 that is desirably presented to the user 102, as well as other users, who view the display 100. As the user 102 becomes proximate to the display 100, however, a shallow viewing angle of the user 102 relative to the content 104 causes the content 104 to become distorted. In other words, as the user 102 approaches the display 100, the content 104 may become undecipherable as portions of the content 104 become progressively further from the user 102.

SUMMARY

The following is a brief summary of subject matter that is described in greater detail herein. This summary is not intended to be limiting as to the scope of the claims.

Described herein are various technologies pertaining to modifying content that is displayed on a relatively large display screen to correct for distortions in the content caused by a position of the user relative to the display. Pursuant to an example, a relatively large display, which may be a television, a projected display, a liquid crystal display (LCD), a light emitting diode (LED) display, or other suitable display, can have a camera associated therewith that is configured to capture images of users that are viewing the display. An image of a user can be analyzed to ascertain a position of the user relative to the display (in three dimensions). Content, which can include imagery, text, video, or the like, that is desirably rendered on the display can be automatically modified to correct for distortions in the content caused by the position of the user relative to the display. The resulting imagery shown on the display can be anamorphic in nature, such that it meets the expectations of the eyes of the user. In other words, from the perspective of the user, it will appear that the imagery is orthogonal to the line of sight of the user.

As the user continues to approach the display, such that the user is unable to view an entirety of the display at one time, additional transformations can be undertaken with respect to content that is desirably displayed on the display. As the user approaches the display, content orthogonal to the viewing angle of the user (within a region with size that is dependent upon the proximity of the user to the display and predefined shape) can be shrunken, and content can be progressively expanded as such content is further from the user on the display. This can create the illusion, from the perspective of the user, that the user is being enveloped by content shown on the display.

The aforementioned transformations can occur dynamically, such that as the position of the user changes relative to the display, the content can be updated based at least in part upon the dynamic positions of the user. Further, the content displayed is not limited to any sort of still image, but can be video, imagery, text or the like. The display itself may be, for example, a billboard, a display placed in a storefront window, a display a placed exterior to a particular building, etc. Additionally, as televisions continue to increase in size, it may be desirable to perform one or more of the translations described above on a television in the home of a user.

Other aspects will be appreciated upon reading and understanding the attached figures and description.

DETAILED DESCRIPTION

Figure 1:
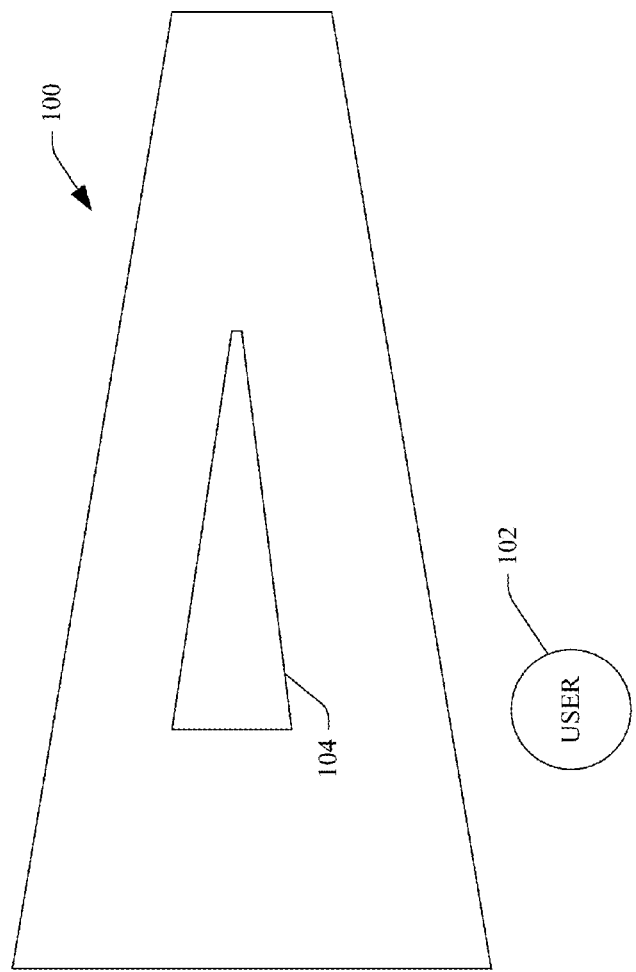
FIG. 1 illustrates a relatively large display and a user in relation to such display.

Various technologies pertaining to displaying content on relatively large displays will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The terms "component" and "system" are also intended to encompass hardware that is configured to perform particular tasks, such as a field-programmable gate array or the like. The computer-executable instructions may include a routine, a function, or the like. It is also to be understood that a component or system may be localized on a single device or distributed across several devices.

Figure 2:
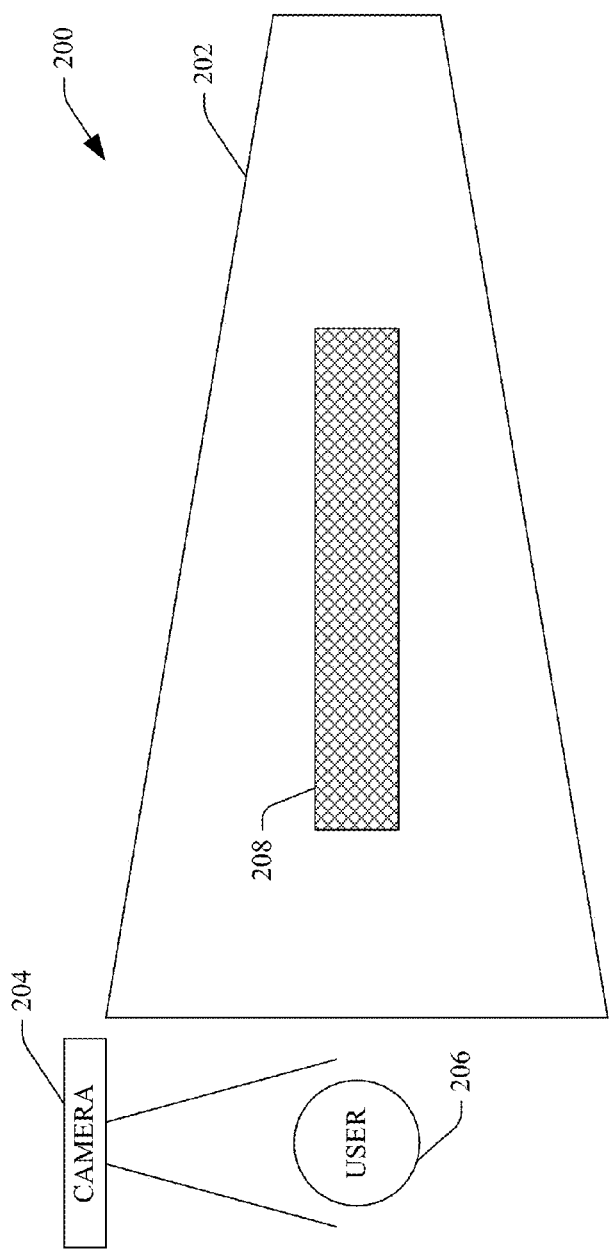
FIG. 2 illustrates an anamorphic transformation of content on a display that is based at least in part upon a determined location of a user.

With reference now to FIG. 2, an exemplary system 200 that facilitates dynamically modifying content for display on a large display to correct distortions in the content caused by a shallow viewing angle of a user relative to the display is illustrated. The system 200 comprises a large display 202 that is configured to display at least some content thereon. The content can be a still image, video, text, or the like. The display 202 may be any suitable type of display, including but not limited to a projected display, a liquid crystal display (LCD), a light emitting diode (LED) display, a plasma display, or other suitable display. Pursuant to an example, the display 202 may also be a billboard that is placed proximate to a roadway or train tracks, a display positioned proximate to a storefront, a relatively large display at a stadium (baseball stadium, football stadium, etc.), a movie theater display, a display positioned in a museum or other public building, a display in an airport, a relatively large television display in the home of a user, or the like. Accordingly, concepts described herein are not intended to be limited to a particular type of display or location of display. The size of the display, in an example, can be at least fifty inches in width and at least thirty inches in height. In another example, the size of the display can be at least five feet in width by at least three feet in height. In still yet another example, the display can be at least fifteen feet in width by at least three feet in height.

The system 200 additionally comprises a camera 204 that is configured to capture images of users that are proximate to the display 202. While not shown, the camera 204 may be embedded in the display 202, such that the camera 204 can capture images of a user 206 as the user 206 approaches the display. For instance, the camera 204 may include a wide angle lens, such as is found in a fisheye camera, that can capture images of users as such users approach the display 202. Alternatively, the camera 204 can be a web-cam or any other suitable camera. Further, the camera 204 may be or include a depth sensor that is configured to generate depth images that are indicative of a distance between the user 206 and point on the display 202 that is nearest to the user 206. As will be described in greater detail herein, data output by the camera 204 can be analyzed by software executing on a computing device to ascertain a three-dimensional position of the eyes of the user 206 relative to the display 202.

The display 202 may desirably display original graphical content to the user 206. The original content may be a portion of a video, a still image, text, or other suitable content. The original content that is desirably displayed on the display 202 can be subject to transformations to generate modified content 208, wherein the modified content 208 corrects distortions in the original content caused by the position of the user 206 relative to the display 202. For example, as the user 206 approaches the display 202, the viewing angle of the user 206 relative to any content that is to be shown on the display 202 will decrease. Such decrease in the viewing angle can cause content on the display 202 to be distorted from the perspective of the user. Accordingly, such original content can be transformed to correct the distortions that are caused by the position of the user 206 relative to the display 202. That is, the modified content 208 that is presented to the user 206 on the display 202 appears legible (natural) from the perspective of the user 206 regardless of the position of the user 206 relative to the display 202. The transformations to be undertaken on the original content causes the original content to be stretched (when the display 202 is viewed centrally and from afar), such that from the perspective of the user 206 the modified content 208 appears as though it were orthogonal to the viewing angle of the user 206 (as opposed to the real world compression that occurs when viewing content from a relatively shallow angle).

Additionally, as the user 206 continues to approach the display 202, transformations can be undertaken that cause a particular region of the display 202 that is nearest to the eyes of the user 206 to become pinched (the imagery in such region is shrunk) while the peripheral area around the view of the user 206 becomes stretched. Ultimately, this can allow the user 206 to view more of the display 202, perspective corrected, when the user 206 is very near the display 202. Accordingly, both anamorphic transformations as well has aforementioned shrinking and stretching of regions of original content can be undertaken to correct distortions that would be seen in the original content if displayed to the user 206, wherein such distortions are caused by the relative position of the eyes of the user 206 with respect to the display 202.

Figure 3:
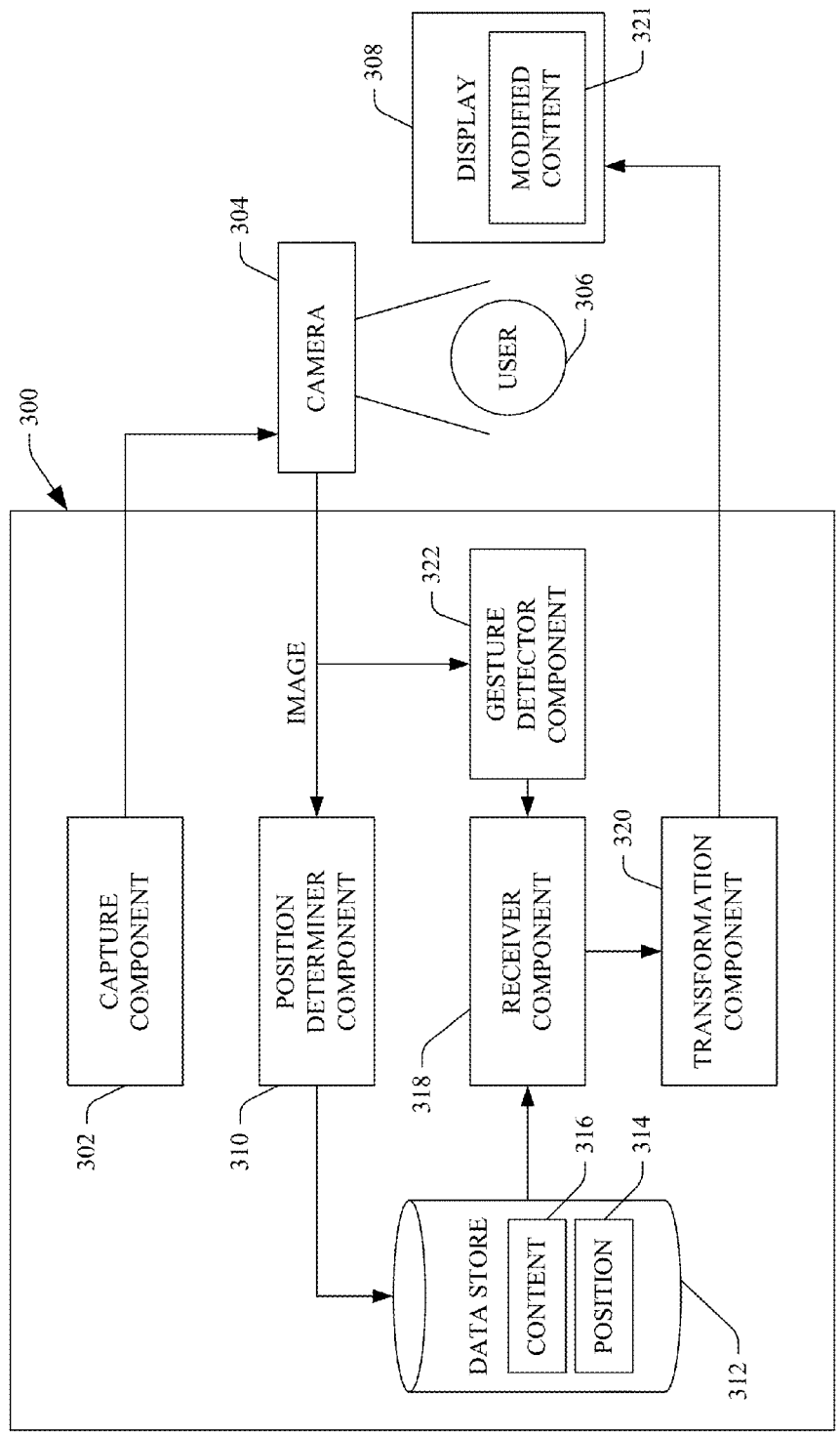
FIG. 3 is a functional block diagram of an exemplary system that facilitates transforming content on a relatively large display to correct for distortions caused by a position of a user relative to the display.

With reference now to FIG. 3, an exemplary system 300 that facilitates modifying content to correct distortions existent in such content caused by a position of a user relative to a large display is illustrated. The system 300 may be included in a television, a projector, a set top box (such as a videogame console, a cable box, a DVD player, etc.) or some other computing device that is coupled to a display. The system 300 comprises a capture component 302 that is in communication with a camera 304. The capture component 302 causes the camera 304 to capture an image of a user 306 relative to a large display 308. In an example, the capture component 302 may be a timer that outputs signals to the camera 304 to cause the camera 304 to capture images of the user 306 relative to the display 308 periodically. In another example, the capture component 302 may include a motion or noise detector that detects motion or noise relative to the display 308 and causes the camera 304 to capture an image responsive to the capture component 302 detecting such motion or noise. While the capture component 302 is being shown as part of the system 300, it is to be understood that the camera 304 may include the capture component 302. The capture component 302 may also be external to the system 300 and the camera 304.

The camera 304 outputs an image that includes the user 306 relative to the display 308. A position determiner component 310 receives the image output by the camera 304 and estimates/computes a position of the eyes of the user 306 relative to the display 308 based at least in part upon the image. For example, the camera 304 may include a wide angle lens, such that the user 306 can be captured in an image as the user 306 approaches the display 308. The position determiner component 310 can analyze the image output by the camera 304 and can estimate a position in three dimensions of the eyes of the user relative to the display 308.

The system 300 can further comprise a data store 312, wherein the data store 312 can retain a position 314 of the eyes of the user 306 relative to the display 308 computed by the position determiner component 310. The data store 312, for example, may be a portion of memory that can be quickly accessed by a processor, such as a GPU. The data store 312 can also comprise original content 316 that is desirably displayed on the display 308. Pursuant to an example, the original content 316 may be a frame of a video that is desirably displayed on the display 308. In another example, the original content 316 may be a still image that is desirably displayed on the display 308. It is therefore to be understood that the original content 316 may be any suitable digital content that can be displayed on the display 308.

The system 300 further comprises a receiver component 318 that receives the original content 316 that is desirably displayed on the display 308 as well as the position 314 of the eyes of the user 306 relative to the display 308. A transformation component 320 can be in communication with the receiver component 318 and can dynamically modify the original content 316 to cause modified content 321 to be displayed to the user 306 on the display 308 based at least in part upon the location of the eyes of the user 306 relative to the display, wherein the modified content 321 corrects view distortions that would have been perceived by the user 306 if the original content 316 were rendered on the display 308. Operation of the transformation component 320 will be described in greater detail below.

Furthermore, the display 308, in an exemplary embodiment, may be interactive in nature. For instance, the camera 304 can be configured to capture an image of the user 306 when the user is making a gesture with respect to at least a portion of the modified content 321 that is displayed on the display 308. A gesture detector component 322 can analyze the image from the camera 304 and recognize the gesture being performed by the user 306. This gesture, for instance, may be the user pointing at a particular portion of the modified content 321 displayed on the display 308. The receiver component 318 can receive the gesture that has been detected by the gesture detector component 322, and the transformation component 320 can cause content on the display 308 to be presented to the user 306 based at least in part upon the gesture detected by the gesture detector component 322. For example, the user 306 may be pointing to a portion of the modified content 321 on the display (which is a transformation of the original content 316).

The gesture detector component 322 can determine a position on the display 308 where the user 306 is pointing, and such position can be mapped to pixels in the modified content 321. In an exemplary embodiment, the pixels in the modified content 321 can then be mapped to pixels in the original content 316, such that plurality of pixels that have been pointed to by the user 306 in the original content 316 can be identified. Based upon the identification of the pixels in the original content 316, new content can be generated for display to the user 306 (due to the user interaction with the display 308), and this new content can be subjected to transformation by the transformation component 320 to correct for distortions.

As mentioned above, the system 300 may be comprised by a television that includes the display 308, by a projector that projects content on the display 308, by a set top box that causes imagery to be displayed on the display 308, or other suitable computing device. The display 308 may be a relatively large display. For instance, the display 308 may be at least 60 inches wide and at least 30 inches tall. In another example, the display 308 may be at least 5 feet wide and at least 3 feet tall. In still yet another example, the display 308 may be at least 15 feet wide and 5 feet tall. In still yet another example, the display may be at least 40 feet wide and at least 20 feet tall. The camera 304 may be a web camera that is mounted in the display 308, such that the camera 304 can capture images of the user 306 as the user 306 approaches the display 308. In another example, the camera 304 may be mounted above the display 308, such that the camera 304 can capture images of the user 306 as the user 306 approaches the display 308.

In addition to the camera 304, a depth sensor (not shown) can be employed in connection with determining a position of the user 306 (the eyes of the user) relative to the display 308. The depth sensor can output depth information that indicates a smallest distance between the user 306 the display 308. In yet another exemplary embodiment, the camera 304 may not need be included. Instead, the user 306 may have a sensor attached thereto that outputs data that is indicative of location of the user 306, such as a global positioning system sensor. Given an estimate of the height of the user 306 (which can be provided by the user or otherwise estimated), the position of the user 306 relative to the display 308 can be determined based at least in part upon coordinates output by the GPS sensor and known geographic location of the display 308.

The transformation component 320 can perform a variety of different types of transformations on pixels in the original content 316 when transforming the pixels to create the modified content 321 for display on the display 308. In an example, the transformation component 320 can employ a first technique, a second technique, or a combination of the first and second technique when transforming the original content 316 to correct for distortions caused by the location of the user 306 relative to the display 308.

In the first technique, the original content 316 is stretched by the transformation component 320 so that the user 306 sees the resultant modified content 321 on the display 308 as though such content 321 were orthogonal to the viewing direction of the user, as opposed to the real world compression that would occur when the user 306 views content from a relatively shallow viewing angle. The second technique is a normalization that can be employed when the user 306 becomes relatively close to the surface of the display 308. In such a technique, a predefined shape of a region (size of which can depend upon the proximity of the user 306 to the display 308) can become pinched or shrunken while the peripheral area around such region can become stretched progressively away from the user 306. This type of normalization can allow the user 306 to see more of the display, perspective corrected, when the user 306 is very close to the display 308 (such as when the display is a touch-sensitive display and the user 306 is interacting with the display 308).

With more particularity, the transformation component 320 can render the original content 316 as the modified content 321 on the display 308 within a three-dimensional scene framework. A coplanar mesh of contiguous triangle pairs can be created by the transformation component 320, and can be arranged in a grid with a defined origin point placed at the center of the grid. The transformation component 320 can then texture map the original content 316 on such mesh. The transformation component 320 may then compute projections and view matrices based at least in part upon the position of the user 306 relative to the display 308.

The transformation component 320 can then rotate the world transform of the mesh in such a way as to face a direction that is arrived at through monitoring of the location of the user 306, resulting in generation of the modified content 321.

Due to the mathematical transformations undertaken by the transformation component 320 related to rendering a three-dimensional scene from a perspective aware camera simulation, as the mesh rotates to face the viewer, the texture mapped pixels of the mesh closest to the viewer will shrink, and the area furthest away from the viewer will stretch, which creates an optical illusion in the eyes of the user 306 that the resultant modified content 321 is of proper proportions, consistent with how the image would appear to the user 306 if the user 306 were viewing the image orthogonally. As the position of the user 306 changes relative to the display 308, the world transform of the mesh can be rotated to correspond to the detected position of the user 306 relative to the display 308.

The aforementioned technique is particularly beneficial when the user 306 is far enough from the display 308 to view an entirety of the display 308. In many cases, however, the user 306 will be quite close to the display 308, such that the user 306 will be unable to visually take in an entirety of the display 308. For example, when the user 306 wishes to approach and interact with content on the display 308, the user 306 will typically become close enough to the display 308 such that the user 306 is unable to visually take in all the content on the display 308. In such a case, as the user 306 approaches the display 308, the view angle for the pixels at the periphery of the display become increasingly shallow, distorting the content portrayed by those pixels more and more to the point where that content becomes useless (e.g., the user 306 is unable to comprehend the content). Additionally, without transformations, as the user 306 approaches the display 308, the imagery orthogonal to the user 306 becomes unnecessarily larger (from the perspective of the user 306) without allowing the user 306 to take in any new or additional content.

Accordingly, the transformation component 320 can apply mathematical transformations to the original content 316, thereby shrinking the portions of the original content 316 that are orthogonal to the user 306 (in a predefined region with a size based upon proximity of the user 306 to the display 308) while progressively stretching imagery in the original content 316 beyond such region as the pixels of the original content 316 approach the edges of the display 308. The transformation component 320 can use a variety of different transformations to achieve this effect, but for the purposes of explanation a relatively simple mathematical sine function is presented herein, which is based off of the distance of the user 306 from the nearest point on the surface of the display 308, as well as the horizontal and vertical position of the eyes of the user 306 relative to the screen.

In an exemplary embodiment, the spatial coordinate system can be initiated at the upper left of the surface of the display 308 and far enough from the display 308 to presume that no normalization of any kind is needed (which can depend upon size of the display 308). That position can be labeled as (0, 0, 0). At the right side of the display 308, the x coordinate becomes 1. At the bottom of the display 308, the y coordinate becomes 1. At the surface of the display 308, the z coordinate becomes 1.

Using the algorithm shown below, the transformation component 320 can utilize the above tracking information to distort or re-map how the texture mapping occurs on a per pixel basis, where each pixel has what is known as a two-part UV coordinate, indicating where along a texture's horizontal and vertical axis a particular pixel's color information should be taken from. Such an algorithm is set forth below:

```
float Amount = CenterZ;
float Radius = -1.0f;
float2 center = { CenterX, CenterY };
float2 displace = center - uv;
float range = saturate(
    (length(displace) * (abs(-sin(Radius * 8) * Radius) +
0.00000001F))
    )-.5f;
return tex2D(DiffuseSampler, uv + displace * range * Amount);
```

This algorithm shows near field re-mapping using a pixel shader in HLSL, an industry-standard pixel shading language. Other values which have not been mentioned herein can be used to tweak the overall intensity, shape, or distortion attenuation. Radius is but one example of how this algorithm can be amended or custom tailored to a specific purpose. The two techniques, again, may be performed individually by the transformation component 320 or in conjunction.

Figure 4:
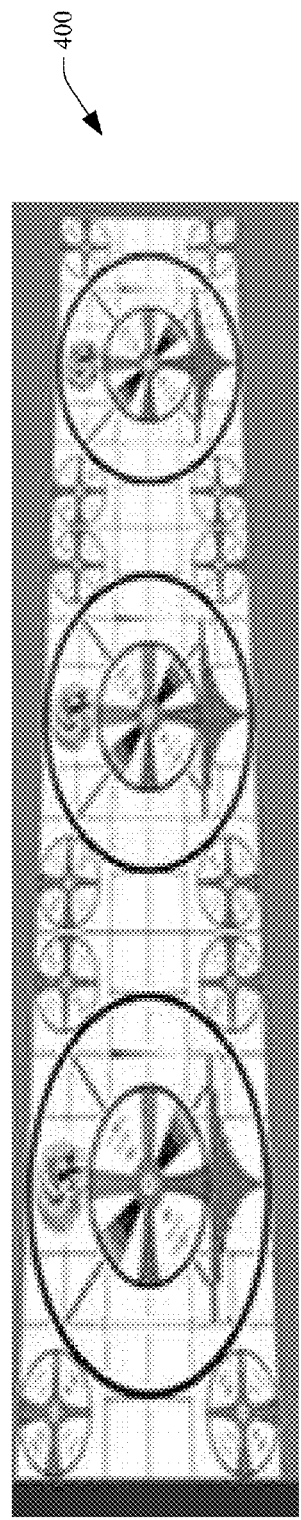
FIG. 4 illustrates an exemplary transformation of content on a display to correct distortions caused by a position of a user relative to the display.

With reference now to FIG. 4, exemplary depiction 400 of the modified content 321 that can be displayed on a relatively large display subsequent to transformations being undertaken on the original content 316 by the transformation component 320 is illustrated. FIG. 4 illustrates the modified content 321 when the user 306 is viewing the display 308 at a relatively shallow angle but at a position where the user 306 may still be able to take in an entirety of the display 308. In such an example, imagery that is nearest to the user 306 can be dynamically shrunk, while imagery is progressively stretched as it becomes further from the user 306. This is known as an anamorphic illusion and can be undertaken dynamically by the transformation component 320 based upon a recognized and tracked position of the user 306 relative to the display 308.

Figure 5:
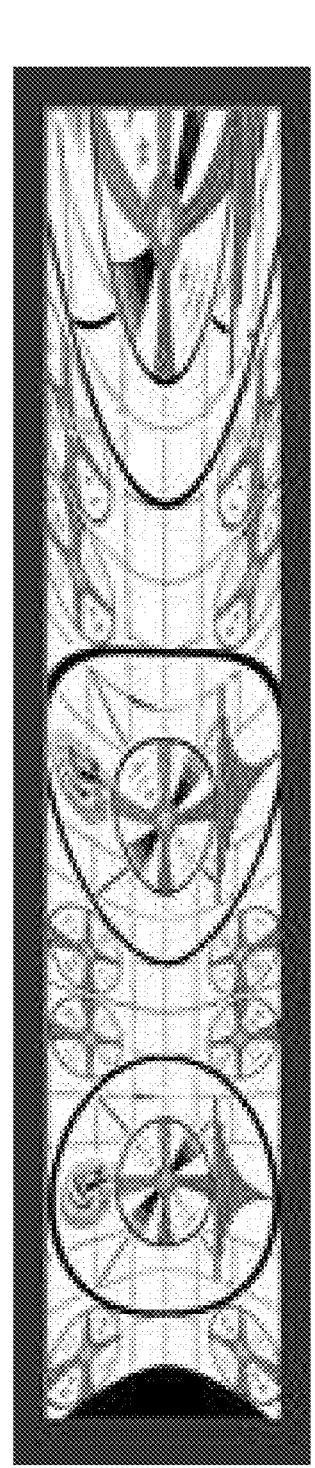
FIG. 5 illustrates an exemplary transformation that corrects for distortions in content depicted on the display caused by a position of a user relative to the display.

Now referring to FIG. 5, another exemplary depiction 500 of the modified content 321 that can be displayed on a relatively large display subsequent to transformations being undertaken on the original content 316 by the transformation component 320 is illustrated. In the example shown in FIG. 5, the user 306 is positioned relatively proximate to the display 308. As can be ascertained, the imagery on the display 308 that is closest to the user 306 is bowed inwards, while the remainder of the imagery is stretched to give the user 306 the feeling of being enveloped by the content. As mentioned above, a shape, which can be arbitrary, with a size that is dependent upon a proximity of the user 306 to the display 308 can include imagery that is bowed inwards, whereas imagery outside of that region is bowed outwards creating a virtual sphere of imagery.

Figure 6:
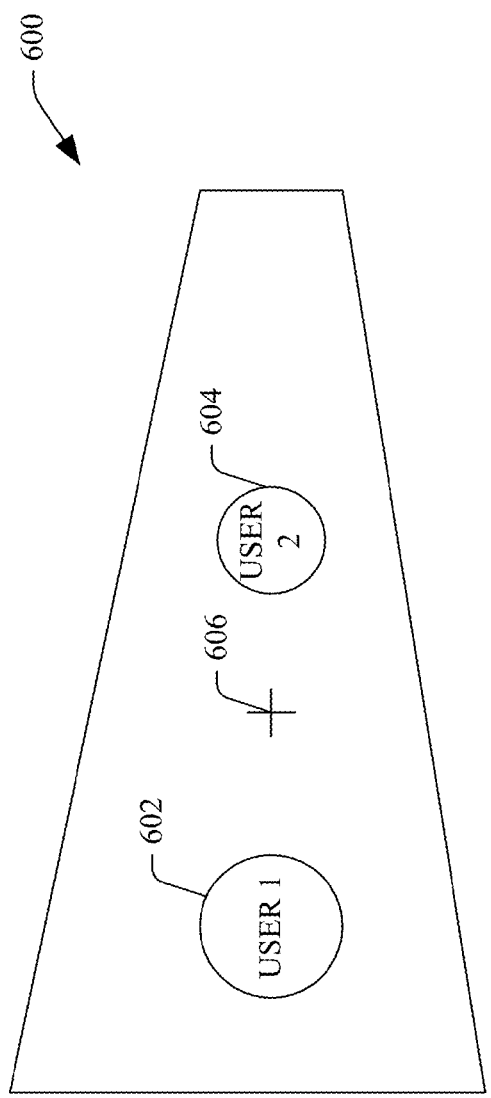
FIG. 6 illustrates a scenario when two users may be proximate to a large display at a single instance in time.

Now referring to FIG. 6, an exemplary display 600 is shown. In this example, multiple users 602 and 604 are simultaneously viewing content on the relatively large display 600. In a first example, the display 600 may be a lenticular display which can display different images to different users depending upon their location. Accordingly, depending on the viewing angle of the first user 602 and the second user 604 relative to the display, different respective content can be presented to such users 602 and 604. If the display 600 is a lenticular display, and the first user 602 and the second user 604 are at viewing angles such that different content can be provided to the two respective users 602 and 604, then the transformation component 320 can individually perform transformations for each of the users 602 and 604 on the display 600.

In many cases, however, the display 600 will not be lenticular, such that the same image is desirably provided to both of the users 602 and 604. In an exemplary embodiment, the transformation component 320 can transform imagery that is desirably displayed on the display 600 based upon the position of the user that was first in time to approach the display 600. That is, the first user 602 approaches the display 600 prior to the second user 604. As the first user 602 approaches the display 600 the transformation component 320 performs mathematical transformations on content as described above. Later, the second user 604 may approach the display 600 at a second position relative to the display. The transformation component 320 can continue to perform the mathematical transformations on pixels in the content based upon the position of the first user 602 relative to the display 600. When the first user 602 leaves the area proximate to the display 600, then the transformation component 320 can begin to perform the mathematical transformations on pixel values in the content based at least in part upon the position of the second user 604 relative to the display 600.

In another exemplary embodiment, a point 606 can be selected on the display 600 based at least in part upon positions of the first user 602 and the second user 604 relative to the display 600. The point 606, for instance, may be a point that is halfway between the eyes of the first user 602 and the eyes of the second user 604 on the display 600. The transformation component 320 may then perform transformations as if eyes of a single user were at the position shown by the point 606. If a third user were to approach the display, the position of the point 606 can change to represent a central point (in three dimensions) from amongst the multiple users. The transformation component 320 may then perform the mathematical transformations on pixel values in image data as if a single person were at such point 606. Other approaches for determining how to perform the aforementioned transformations when multiple users are simultaneously viewing content on the display 600 are contemplated by the inventor and are intended to fall under the scope of the hereto appended claims.

Figure 7:
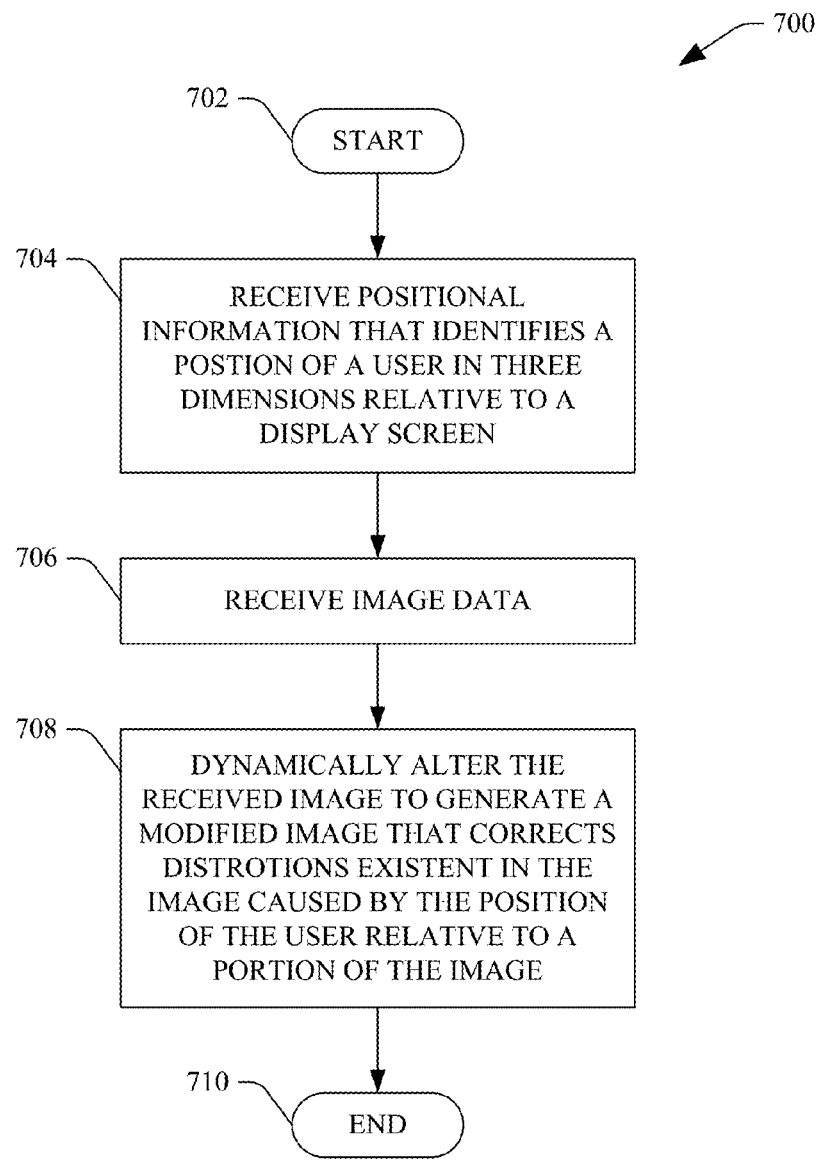
FIG. 7 is a flow diagram that illustrates an exemplary methodology for dynamically altering content on a large display to correct for distortions existent in the content caused by a position of a user relative to the display.
Figure 8:
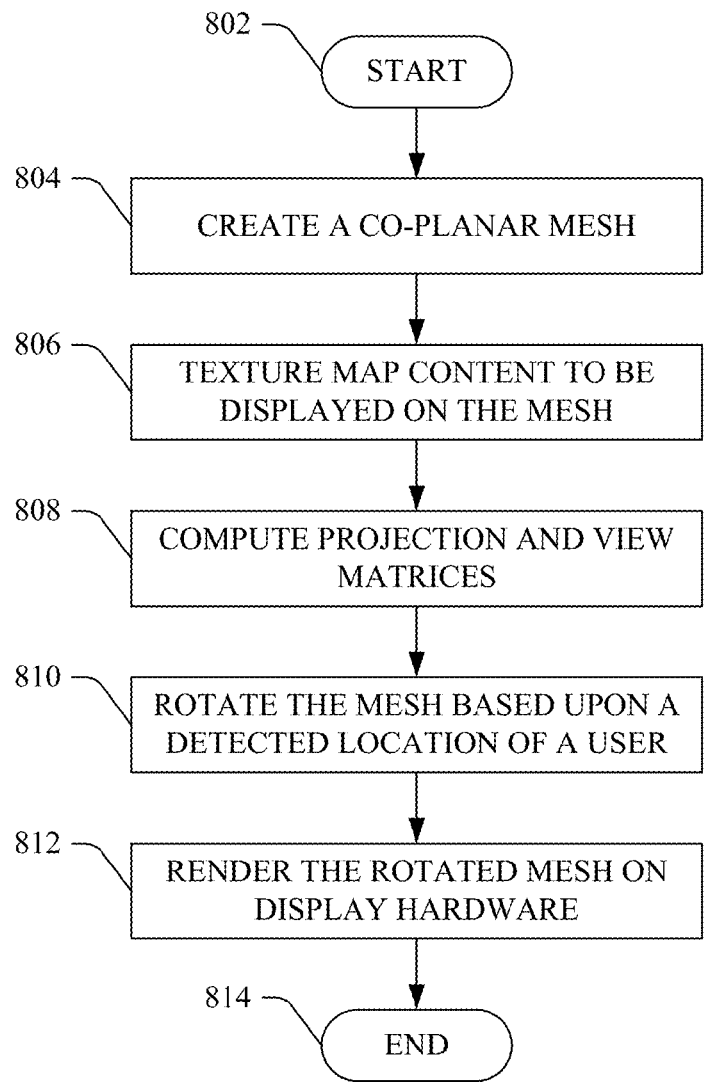
FIG. 8 is a flow diagram that illustrates an exemplary methodology for rendering transformed content on a display.
Figure 9:
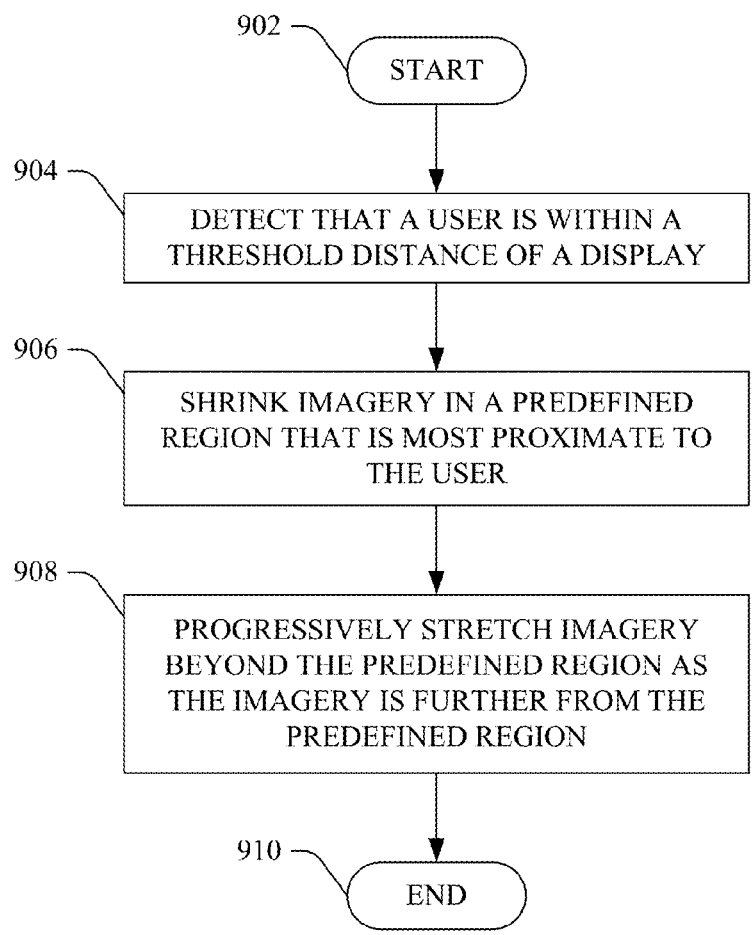
FIG. 9 is a flow diagram that illustrates an exemplary methodology for modifying content to take into consideration a position of a user relative to a large display.

With reference now to FIGS. 7-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 7, an exemplary methodology 700 that facilitates dynamically altering a received image to generate a modified image that corrects distortions caused by a shallow viewing angle of the user is illustrated. The methodology starts at 702, and at 704, positional information that identifies a position of a user in three dimensions relative to a display screen is received. As described above, this positional information can be determined upon analyzing an image of a user relative to the display. In another example, the positional information can be computed based at least in part upon data output by a depth sensor, a GPS sensor, or the like.

At 706, image data is received, wherein the image data defines an image that is desirably displayed on the display screen. The image data comprises a plurality of pixels with a corresponding pluralities of values assigned thereto, wherein the values can be indicative of color, intensity, etc. of portions of the image that are desirably displayed on the display screen.

At 708, a processor is caused to dynamically alter values of a subset of the plurality of pixels based at least in part upon the positional information to generate a modified image. The modified image is generated to correct distortions existent in the image caused by the position of the user relative to the subset of the plurality of pixels. The transformations can be employed to cause an anamorphic illusion to be dynamically generated as the position of the user relative to the display alters. Additionally, the transformations can cause the user to feel enveloped by the imagery, thereby allowing the user to take in additional content that would otherwise not be comprehensible to the user due to the shallow viewing angle of the user relative to the display. The methodology 700 completes at 710.

Now referring to FIG. 8, an exemplary methodology 800 that facilitates generating an anamorphic illusion on a display based upon a dynamically changing position of a user relative to the display is illustrated. The methodology 800 starts at 802, and at 804 a coplanar mesh of contiguous triangle pairs is created, arranged in a grid, with an origin placed at the center of the grid.

At 806, content that is to be displayed on the display is texture mapped onto the mesh. This content can be images, text, video, etc.

At 808, projection and view matrices are computed, and at 810, the mesh is rotated at an angle based upon a detected location of a user relative to the display. At 812, the rotated mesh is rendered on display hardware, and the methodology 800 completes at 814.

Now referring to FIG. 9, an exemplary methodology 900 that facilitates generating an illusion on a display to cause a user to feel as if she is being enveloped by content rendered on the display is illustrated. The methodology 900 starts at 902, and at 904 a detection is made that a user is within a threshold distance of a display (a distance where the user is unable to visually take in an entirety of the display). At 906, imagery in a predefined region that is most proximate to the user on the display is bowed inward or shrunken, thereby causing additional information to be presented to the user directly in front of the user. At 908, imagery beyond the predefined region is progressively stretched as the imagery is further from the predefined region (towards the periphery of the display). The methodology 900 completes at 910.

Figure 10:
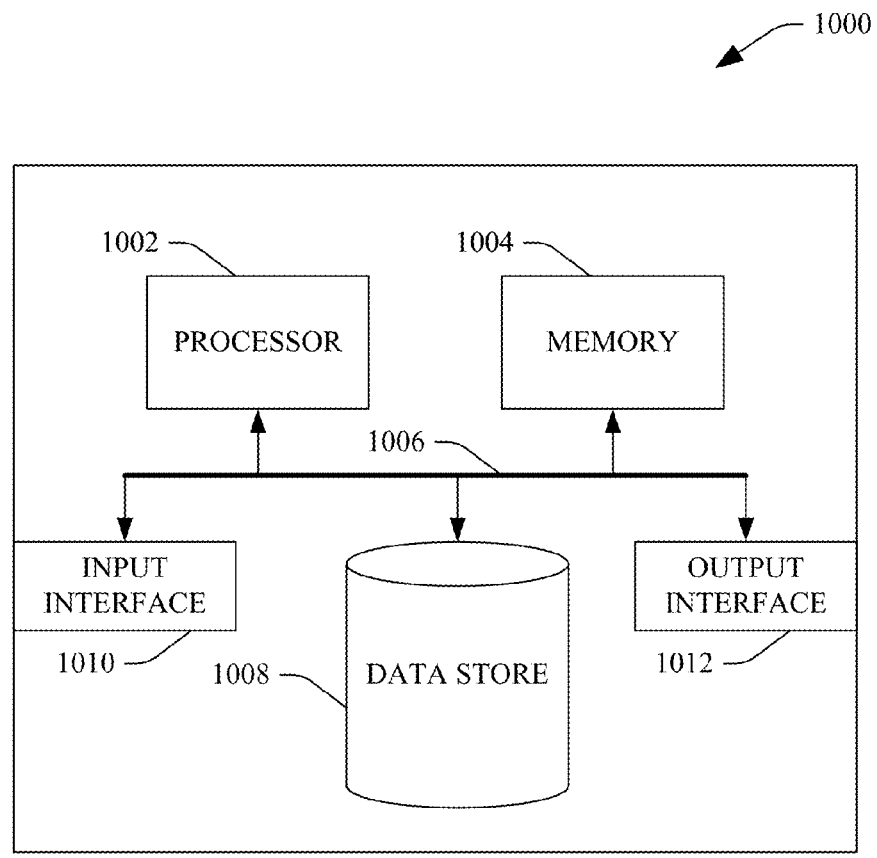
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be used in a system that supports dynamically generating anamorphic illusions on relative large displays. In another example, at least a portion of the computing device 1000 may be used in a system that supports performing mathematical transformations on pixels to dynamically alter content for display to a user based upon a position of the user relative to a display. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store content, such as images, video, text, etc.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, content, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
receiving positional information that indicates a position of a user in three dimensions relative to a display;
receiving image data, the image data defining an image that is to be displayed on the display, the image data comprising a plurality of pixels with a corresponding plurality of values assigned thereto; and
by a processor, dynamically altering values of a subset of the plurality of pixels based at least in part upon the positional information to generate a modified image, wherein altering the values of the subset of the plurality of pixels comprises:
shrinking a first region of the image in the image data; and
stretching a second region of the image in the image data, the second region surrounds the first region,
wherein the modified image corrects distortions existent in the image caused by the position of the user relative to the subset of the plurality of pixels such that imagery in the modified image displayed at a periphery of the display appears to the user as being orthogonal to a line of sight between the user and the imagery.

2. The method of claim 1, wherein the display is at least 60 inches wide and at least 30 inches tall.

3. The method of claim 1, wherein the display is at least 5 feet wide and at least 3 feet tall.

4. The method of claim 1 configured for execution on a television that comprises the display.

5. The method of claim 1 configured for execution on a set top box that is in communication with the display.

6. The method of claim 1, wherein the image is a portion of a video that comprises a plurality of frames, and wherein the processor is caused to dynamically alter values for subsets of pixels in the respective frames to generate modified images that correct distortions in the frames caused by the position of the user relative to the subsets of the pixels.

7. The method of claim 1, further comprising:
causing a camera to capture an image of the user relative to the display; and
detecting the position of the user relative to the display based at least in part upon the image captured by the camera.

8. The method of claim 7, further comprising;
causing a depth sensor to capture a depth image of the user relative to the display; and
detecting the position of the user relative to the display based at least in part upon the image captured by the depth sensor.

9. The method of claim 1, further comprising:
detecting that the user has made a gesture towards a particular portion of the modified image; and
causing different content to be displayed to the user based at least in part upon the detecting that the user has made the gesture towards the particular portion of the modified image.

10. The method of claim 1, further comprising:
detecting a viewing angle of the user relative to the display; and
causing the processor to dynamically alter values of the subset of the plurality of pixels based at least in part upon the viewing angle of the user relative to the display.

11. The method of claim 1, further comprising:
detecting a viewing direction of the user relative to the display;
shrinking the first region such that, when displayed in the modified image, the first region intersects the viewing direction of the user.

12. The method of claim 1, further comprising:
receiving second positional information that indicates a three-dimensional position of a second user relative to the display screen;
selecting a region of the image based at least in part upon the positional information and the second positional information; and
causing the processor to dynamically alter values of the subset of the plurality of pixels based at least in part upon the positional information and the second positional information to generate a second modified image, wherein the second modified image corrects distortions existent in the image from a perspective of a hypothetical user that is orthogonal to the region of the image that has been selected based at least in part upon the positional information and the second positional information.

13. A system, comprising:
at least one processor; and
memory that comprises instructions that, when executed by the at least one processor, cause the at least one processor to perform acts comprising:

receiving original content that is to be displayed on a display, the original content comprising a plurality of pixels that have a corresponding plurality of values assigned thereto; and receiving a position of eyes of a user, in three-dimensions, relative to the display;

generating modified content for presentment on the display based upon the original content and the position of the eyes of the user, wherein generating the modified content comprises:

expanding a first region in the original content; and shrinking a second region in the original content, wherein the second region is surrounded by the first region, the modified content corrects distortions that would be perceived by the user in the original content if displayed on the display, the distortions caused by the position of the eyes of the user relative to the display; and displaying the modified content on the display, such that imagery in the modified content appears to the user as being orthogonal to a line of sight between the user and the imagery when the eyes of the user are at the position.

14. The system of claim 13, wherein generating the modified content comprises generating an anamorphic illusion based upon the original content and the position of the eyes of the user relative to the display.

15. The system of claim 13, the acts further comprising: causing a camera to capture an image of the user; and determining the position of the eyes of the user relative to the display based upon the image of the user.

16. The system of claim 13 comprised by a television.

17. The system of claim 13, the acts further comprising: detecting that the user has made a gesture with respect to a particular portion of the modified content; and causing additional modified content to be displayed on the display based upon the gesture detected by the gesture detector component.

18. The system of claim 13 comprised by a set top box.

19. The system of claim 13 comprised by a projector.

20. A computer-readable medium comprising instructions that, when executed by a processor, cause the processor to perform acts comprising:

receiving an image of a user who is proximate to a display, the display being at least five feet in width and at least three feet in height;

responsive to receiving the image, determining a three-dimensional position of eyes of the user relative to the display;

receiving original two-dimensional content for display on the display; and generating modified content for presentment on the display based upon the original content and the three-dimensional position of the eyes of the user relative to the display, wherein generating the modified content comprises:

shrinking a first region in the original content based upon where, on the display, a viewing direction of the user is determined to intersect the display; and stretching a second region in the original content, the second region surrounds the first region, wherein the modified content corrects distortions that would be perceived by the user if the original content were displayed on the display, the distortions caused by the three-dimensional position of the eyes of the user relative to the display.

* * * * *